(12) United States Patent
Ryu

(10) Patent No.: US 7,489,851 B2
(45) Date of Patent: Feb. 10, 2009

(54) METHOD AND APPARATUS FOR REPETITIVE PLAYBACK OF A VIDEO SECTION BASED ON SUBTITLES

(75) Inventor: Han Seop Ryu, Osan-si (KR)

(73) Assignee: LG Electronics Inc., Seoul (KR)

( * ) Notice: Subject to any disclaimer, the term of this patent is extended or adjusted under 35 U.S.C. 154(b) by 776 days.

(21) Appl. No.: 10/997,975

(22) Filed: Nov. 29, 2004

(65) Prior Publication Data
US 2005/0152683 A1 Jul. 14, 2005

(30) Foreign Application Priority Data
Nov. 28, 2003 (KR) ............... 10-2003-0085411

(51) Int. Cl.
H04N 5/93 (2006.01)
(52) U.S. Cl. ............................................. 386/68
(58) Field of Classification Search ................. 386/68, 386/46, 125; 725/55
See application file for complete search history.

(56) References Cited

U.S. PATENT DOCUMENTS 6,434,097 B1 * 8/2002 Lewis et al. ............ 369/47.11
2003/0188312 A1 * 10/2003 Bae et al. .................. 725/55
2003/0190148 A1 10/2003 Lee
2004/0047589 A1 * 3/2004 Kim ......................... 386/46

FOREIGN PATENT DOCUMENTS

| CN | 1447596 A | 10/2003 |
| KR | 10-2000-000221 | 1/2000 |
| KR | 2003-0048330 A | 6/2003 |
| WO | WO 03/056405 | * 7/2003 |
| WO | WO-2005/010880 A1 | 2/2005 |

* cited by examiner

Primary Examiner—David E Harvey
(74) Attorney, Agent, or Firm—Birch, Stewart, Kolasch & Birch, LLP

(57) ABSTRACT

A method and apparatus for repetitive playback of video sections on the basis of subtitles are provided. The method includes receiving a request for a repetitive playback of a certain video section of the video data; retrieving at least one subtitle data block associated with at least one video data block of the certain video section, in response to the request; and repeatedly playing back the at least one video data block in synchronization with the at least one subtitle data block.

10 Claims, 5 Drawing Sheets

*Main Video from DivX file*

How's going these days ?

*Caption Text (Subtitle) from SMI file*

METHOD AND APPARATUS FOR REPETITIVE PLAYBACK OF A VIDEO SECTION BASED ON SUBTITLES

This application claims the benefit of Korean Patent Application No. P2003-085411 filed on Nov. 28, 2003, the entire contents of which are herein fully incorporated by reference.

BACKGROUND OF THE INVENTION

1. Field of the Invention

The present invention relates to a method and apparatus for determining and repeatedly playing back a specific video section on the basis of subtitles being displayed synchronously with a video data stream.

2. Description of the Related Art

Optical discs that are capable of storing large amounts of high-quality video and audio data, have been available on the market. The digital versatile disc (DVD) and DVD rewritable (DVD-RW) are examples of the optical discs. The high-quality moving pictures have been usually provided for users as DVD titles. Recently, based on DivX codec, which is a video codec proposed for better compression, DivX-formatted movies (hereinafter referred to as DivX movies) have been widely provided as downloadable files on-line.

DivX movies usually offer a single language subtitle, not multi-language subtitles. Therefore, users who want to watch a DivX movie with a foreign language subtitle need an additional file that provides a different subtitle comprehensible to the users as well as timing information for synchronization of this subtitle with video streams. This file is commonly referred to as synchronized accessible media interchange (SMI) file.

The SMI file is user-editable. The SMI file includes subtitle data and synchronization timing information required to display the subtitle synchronously with the video stream. As shown in FIG. 1, the subtitle such as "How's going these days?" is displayed in synchronization with the associated video stream at its synchronization start time, which is usually represented by the elapsed time since the start playback time of the DivX movie.

While watching a DivX movie, users who practice listening to foreign languages often want to repeatedly view and listen to particular subtitles and the related audio signals. However, the method to accomplish this is not yet available and is needed.

SUMMARY OF THE INVENTION

Accordingly, the present invention provides a method and apparatus for performing repetitive playbacks, which overcome the limitations and disadvantages of the related art.

It is an object of the present invention to provide a method and apparatus for simply determining and performing a repetitive playback of any specific video section desired on the basis of subtitle data stored in a file separate from a video content.

In accordance with an aspect of the present invention, there is provided a method of performing a repetitive playback of a video section of video data, the video data stored on a recording medium in a DivX format and having video data blocks and subtitle data blocks associated with the video data blocks, the method comprising receiving a request for a repetitive playback of a certain video section of the video data; retrieving at least one subtitle data block associated with at least one video data block of the certain video section, in response to the request; and repeatedly playing back the at least one video data block in synchronization with the at least one subtitle data block.

In accordance with another aspect of the present invention, there is provided a method of performing a repetitive playback of subtitle data, comprising storing, in a first file, video/audio data blocks of a video/audio data stream; storing, in a separate second file, subtitle data blocks of the video/audio data stream; associating the video/audio data blocks with the subtitle data blocks based on access time information; and performing a repetitive playback of at least one subtitle data block using the access time information.

In accordance with another aspect of the present invention, there is provided an apparatus for performing a repetitive playback of a video section of video data, the video data stored on a recording medium in a DivX format and having video data blocks and subtitle data blocks associated with the video data blocks, the apparatus comprising a recording/reproducing part to record and/or reproduce the video data to/from the recording medium; and a controller to receive a request for a repetitive playback of a certain video section of the video data; to retrieve at least one subtitle data block associated with at least one video data block of the certain video section in response to the request; and to repeatedly play back the at least one video data block in synchronization with the at least one subtitle data block.

In accordance with another aspect of the present invention, there is provided an apparatus of performing a repetitive playback of subtitle data, comprising storage means for storing, in a first file, video/audio data blocks of a video/audio data stream, and storing, in a separate second file, subtitle data blocks of the video/audio data stream; and a controller to associate the video/audio data blocks with the subtitle data blocks based on access time information, and to perform a repetitive playback of at least one subtitle data block using the access time information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

The method for repetitive playback of a specific video section in accordance with the present invention is applicable to DVD recorders and various other multimedia apparatuses such as personal computers capable of reproducing DVDs and/or optical discs other than DVDs.

Figure 1:
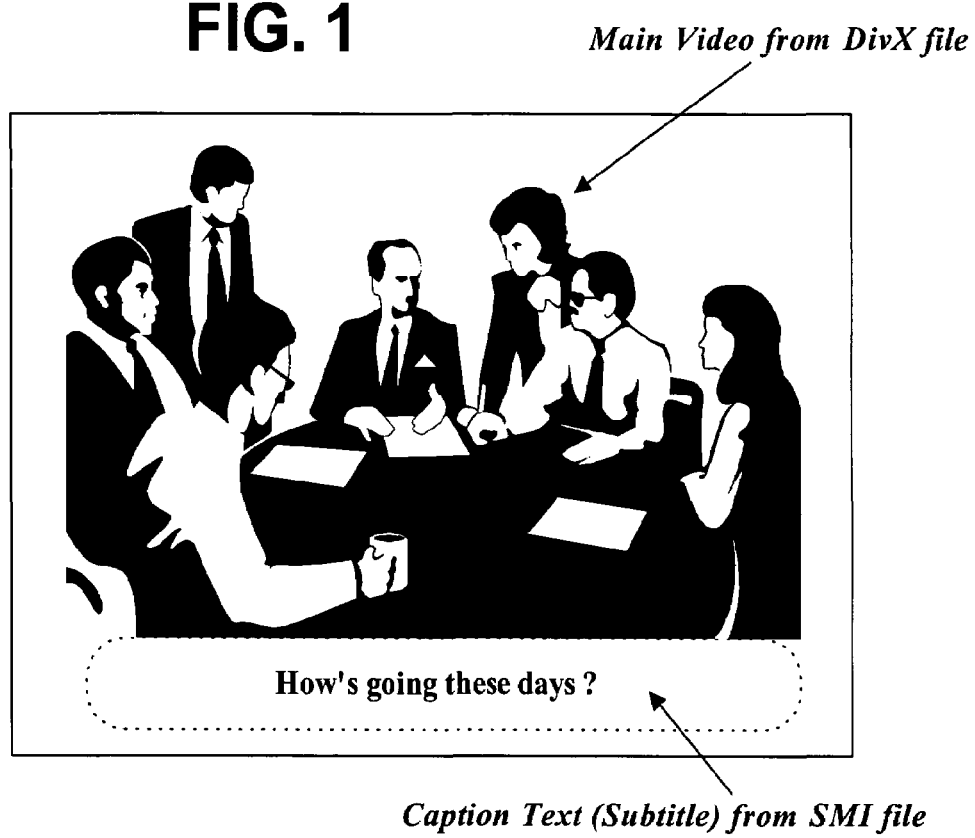
FIG. 1 illustrates an example of synchronously reproduction of a video stream and a subtitle of a DivX movie.
Figure 2:
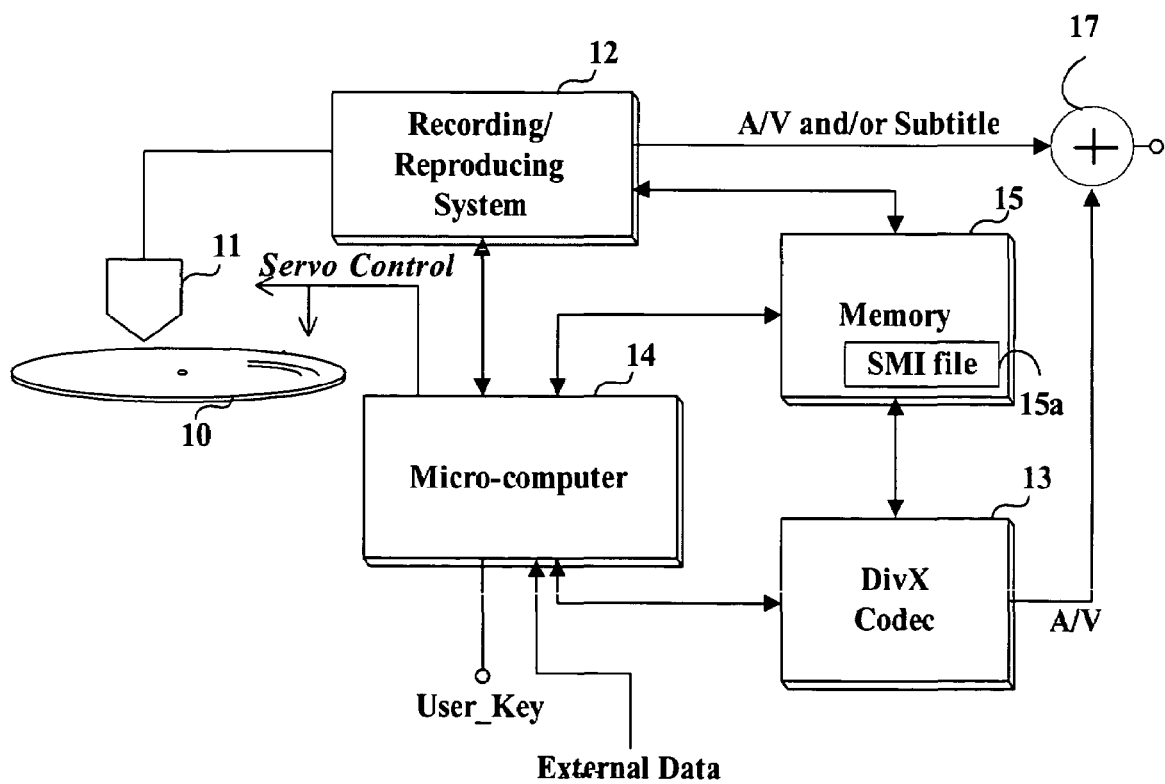
FIG. 2 illustrates a block diagram of an optical disc apparatus in accordance with the present invention.

FIG. 2 depicts a block diagram of an optical disc apparatus in accordance with the present invention. The optical disc apparatus includes, among other things, an optical pickup 11 for writing/reading out signals to/from a recording medium such as an optical disc 10; a recording/reproducing system 12 for modulating and encoding signals to be written to the optical disc 10 and for demodulating and decoding signals read out from the optical disc 10; a DivX codec 13 for coding/decoding DivX-formatted data; a microcomputer 14 for performing servo-control operations and read/write operations; and a memory 15 for temporarily storing DivX-formatted audio and video data as well as text-formatted data stored in a synchronized accessible media interchange (SMI) file 15a. All the components of the optical disc apparatus are operatively coupled.

Figure 4:
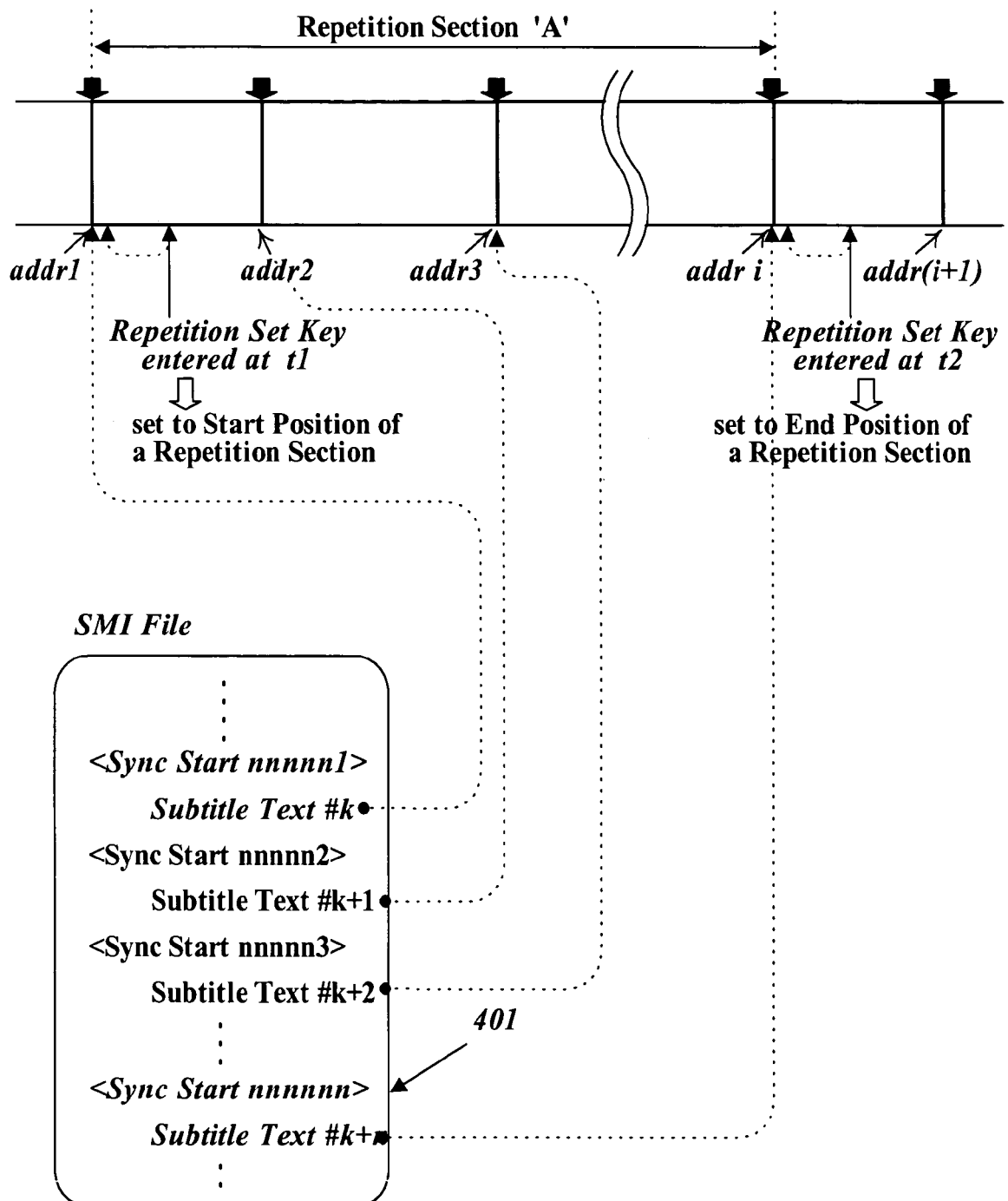
FIG. 4 illustrates how a repetitive playback video section is determined on the basis of caption texts according to the flowchart of FIG. 3.

In the optical disc apparatus, upon a user request for playback of a DivX movie from the optical disc 10, the microcomputer 14 searches for an audio/video (A/V) data file containing the DivX movie by controlling the optical pickup 11 over the optical disc 10 and reproduces it for display to the user. The microcomputer 14 also looks for a SMI file related to the A/V data file from the optical disc 10. Generally, the related SMI file has the same filename as the A/V data file, and includes the subtitle text data and the subtitle display start time information (as shown in FIG. 4) so that the subtitle text can be appropriately displayed with the correct A/V data. If the SMI file exists on the optical disc 10, then the SMI file is read from the disc 10 and the read SMI file is stored in the memory 15. Or the SMI file may be received and loaded into the memory 15 through communication/interface means such as USB ports and/or cables from a remote external information provider, or a network such as the Internet, extranet, or intranet.

Figure 3:
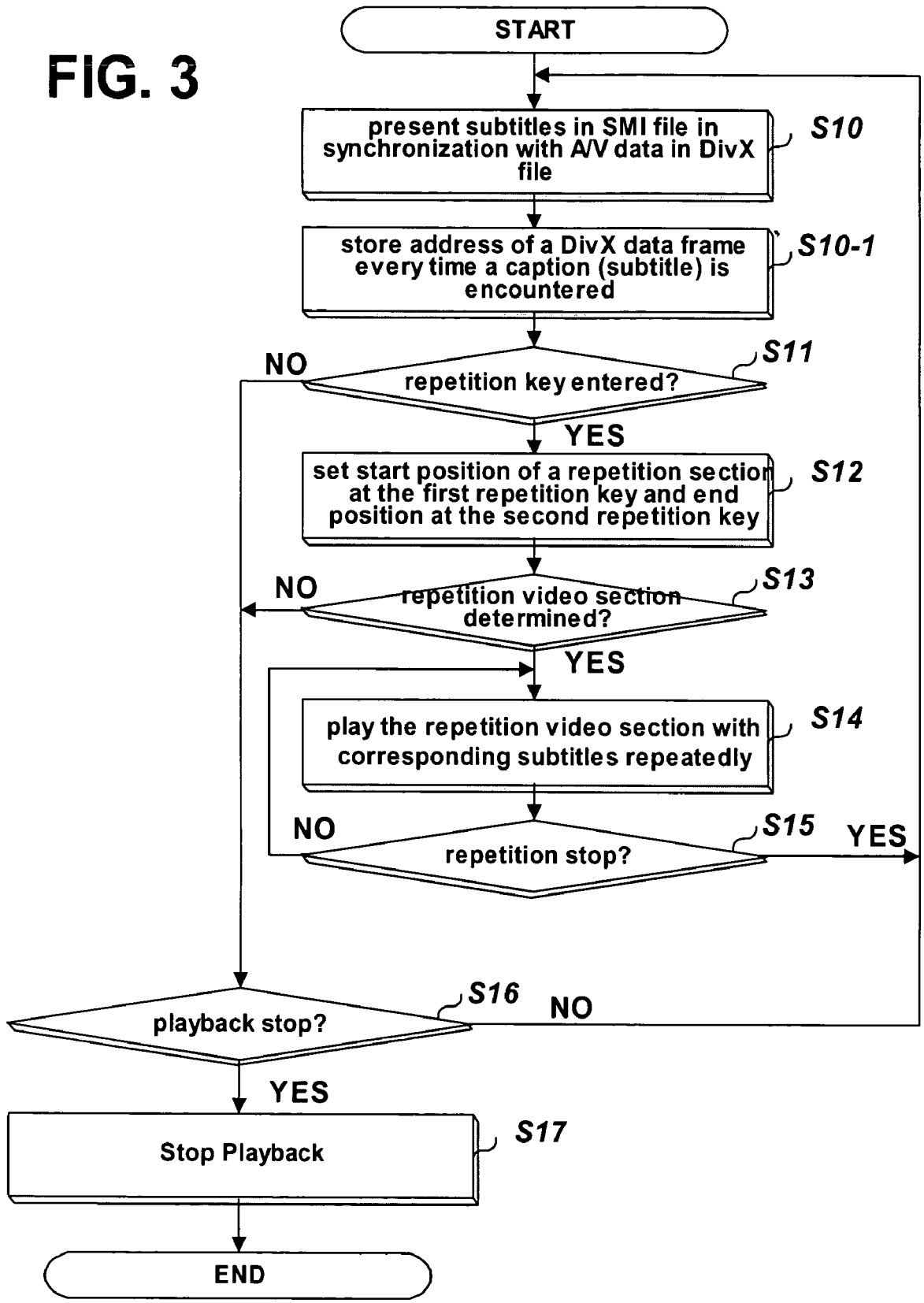
FIG. 3 illustrates a flowchart of an embodiment of a repetitive playback method in accordance with the present invention.

Once the SMI file is loaded on the memory 15, the procedure shown in FIG. 3 is performed, which will be described now in detail below with reference to FIGS. 2 and 3. The steps of FIG. 3 can be implemented by the apparatus of FIG. 2 or other suitable device/system.

Referring to FIGS. 2 and 3, after the DivX movie data is read out from the optical pickup by the optical disc 11, the DivX data stream is sequentially written into the memory 15 after a demodulation process by the recording/reproducing system 12. The DivX data stream in the memory 15 is then decoded sequentially and outputted as A/V (audio/video) signals by the DivX codec 13 to an adder 17. The A/V data and corresponding subtitles in synchronization with the A/V data are presented to a viewer on a screen (S10). The microcomputer 14 starts to count the elapsed time since the start playback time of the DivX data.

If it is determined that there exists a subtitle text having a sync start time equal to the current elapsed playback time, an identifier or identification information (e.g., the address of a data-frame) of the DivX A/V data stream being reproduced at that instant time, and the current elapsed playback time are stored (hereinafter referred to as subtitle display time mark information) (S10-1). The subtitle display time mark information is updated every time a subtitle text in the SMI file is decoded for display.

On the other hand, display format information on the subtitle texts such as font size, color, and display position on a screen, is obtained from the SMI file and is then supplied to the recording/reproducing system 12 by the microcomputer 14 before playback so that the subtitle texts can be displayed on the screen in the designated manner.

During playback of the DivX data, the microcomputer 14 determines if the SMI file loaded in the memory 15 (401 shown in FIG. 4) includes a subtitle text whose display start time information is less than (closest) or equal to the current elapsed time. The subtitle display start time information of the subtitle is referred to herein as sync start time, and is represented by a tag of <Sync Start=nnnnn> as shown in FIG. 4, where nnnnn is assigned the elapsed time value in milliseconds. If there is a subtitle text satisfying this condition, the subtitle text from the memory 15 is inputted to the recording/reproducing system 12 to output video signals for display of the subtitle text.

In this way, video signals decoded by the DivX codec 13 and video signals of subtitle texts generated by the recording/reproducing system 12 are superimposed and displayed so that a user watches the DivX movie together with subtitles. Until the end of the DivX movie or until the user's request for repetitive playback or playback stop, the DivX movie continues to be played back. If the playback stop is requested, then the playback of the DivX move is stopped (S17).

During playback, when a command for a repetitive playback of a video section (hereinafter referred to as A-B repetitive playback command) is entered by a user (S11), a subtitle display time mark information ('addr 1' shown in FIG. 4) is stored to set the repetitive playback start data frame and start time (S12). Reproduction of the DivX audio/video data with the subtitle continues until the A-B repetitive playback command is entered again. When it is determined that the A-B repetitive playback command is entered again, a subtitle display time mark information ('addr i' shown in FIG. 4) is stored to set the repetitive playback end data frame and end time (S12). That is, a user can press/select a designated button on a remote controller, a user menu, an OSD, etc., to indicate the start position of the repetition section, and can press/select the same button or other button to indicate the end position of the repetition section. In this regard, separate "start" and "end" buttons can be provided and used with or without a repetitive play initiating key.

Once the repetitive playback end frame and end time are determined (S13), the A-B repetitive playback is performed immediately. In other words, the microcomputer 14 starts to search for the DivX A/V data matching the repetitive playback start frame in the memory 15. If such is not in the memory 15 (e.g., the buffer already disposed the temporarily stored A/V data), the microcomputer 15 moves the optical pickup 11 on the optical disc 10 by a predetermined number of tracks inwardly to search for the corresponding DivX A/V data frame.

If the DivX A/V data frame is found, the subtitle text associated with the A-B repetitive playback start time is decoded to be displayed on the screen and at the same time, the decoding and reproduction operation of the DivX A/V data restarts from the DivX A/V data frame so that the DivX A/V data and the corresponding subtitle of the repetitive section are displayed simultaneously. At this time, the elapsed time counted by the microcomputer 14 is reset to the A-B repetitive playback start time. At the same time, DivX A/V data to be loaded in the memory 15 from the optical disc 10 is decoded and played back continuously.

If the DivX A/V data being reproduced reaches the A-B repetitive playback end data frame, the A-B repetitive playback of the selected video section is performed repeatedly (S14) until a stop command is entered (S15) in which case, the playback is stopped (S16 or S10).

FIG. 4 illustrates an example of the A-B repetitive playback operation showing that the A-B repetitive playback command is entered at the time of t1 and t2, which are after the sync start times of the k-th and (k+n)-th subtitle texts, respectively (subtitle text #k and subtitle text #(k+n) of SMI file). In this case, the 'A' video section becomes the repetitive playback video section. Here, a start address of a DivX data frame having a position that is equal to or closest (without exceeding) to a start/end position of the repetition section selected by the user is used to define the read repetitive section by the system. If the maximum number of A-B repetitive playback is predetermined or pre-set by a user, then the repetitive playback video section is played back repeatedly for this maximum number of times, and then the repetitive playback function may be turned off automatically without the A-B repetitive playback stop command.

Instead of performing the A-B repetitive playback immediately after the A-B repetitive playback command is entered secondly (or when the end position of the repetitive section is set by the user), the A-B repetitive playback may be performed later upon a user request once the repetitive playback section is chosen.

Figure 5:
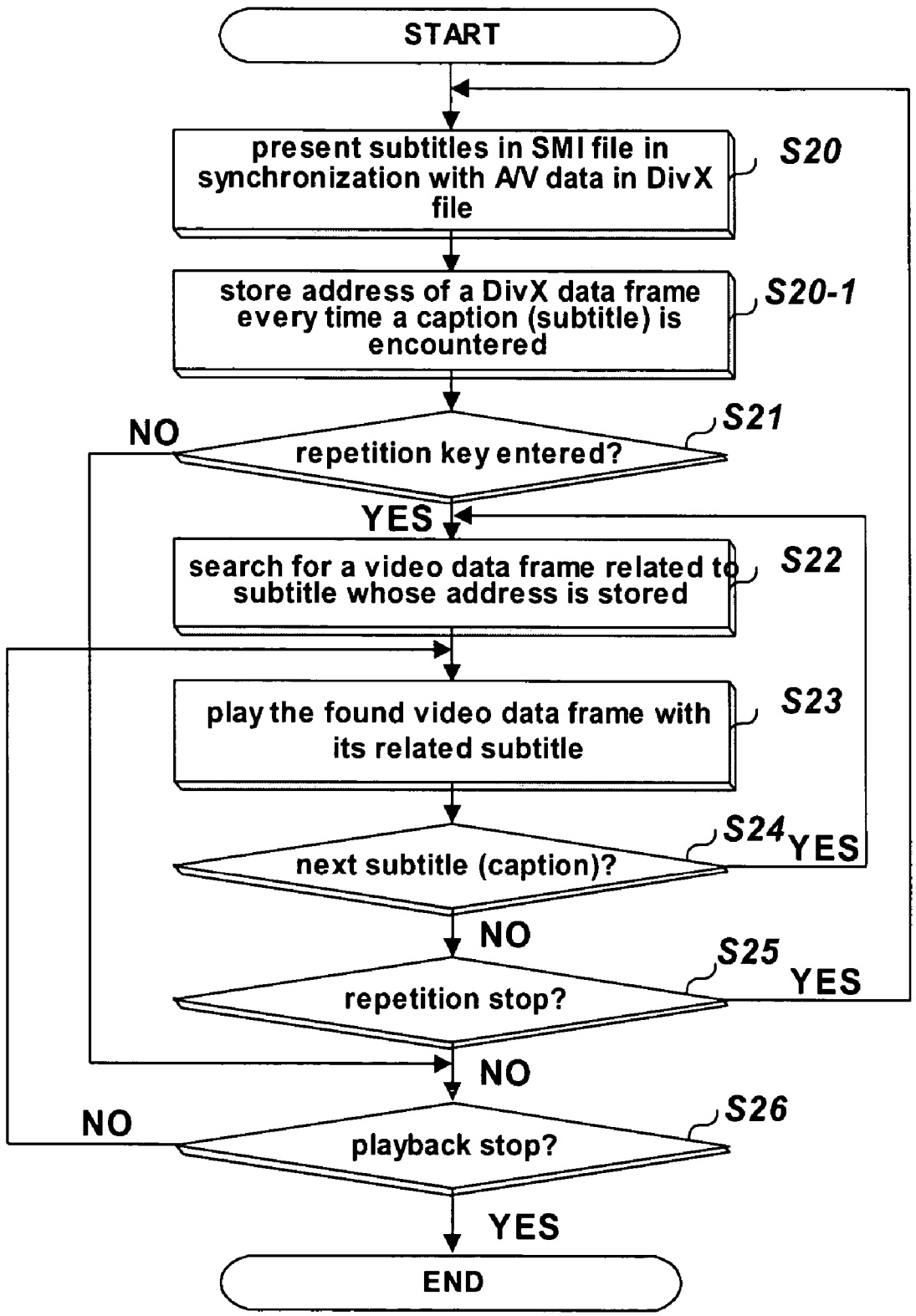
FIG. 5 illustrates a flowchart of another embodiment of a repetitive playback method in accordance with the present invention.

The repetitive playback method in accordance with the present invention is applicable to a repetitive playback section including a single subtitle text. This embodiment will be described below in detail with reference to FIGS. 5 and 6.

As in the foregoing embodiment, once an A-B repetitive playback command is entered by a user (S21) during the playback operation (S20, S20-1) that is the same as steps S10 and S10-1, the microcomputer 14 starts to search for the DivX A/V data matching the current subtitle display time mark information ('addr 2' shown in FIG. 6) in the memory 15 (S22). In other words, the A-B repetitive playback start data frame and start time are determined based on the subtitle display time mark information lastly stored prior to the A-B repetitive playback command. If such is not in the memory 15, the microcomputer 15 moves the optical pickup 11 over the optical disc 10 by a predetermined number of tracks inwardly to search for the corresponding DivX A/V data frame.

Figure 6:
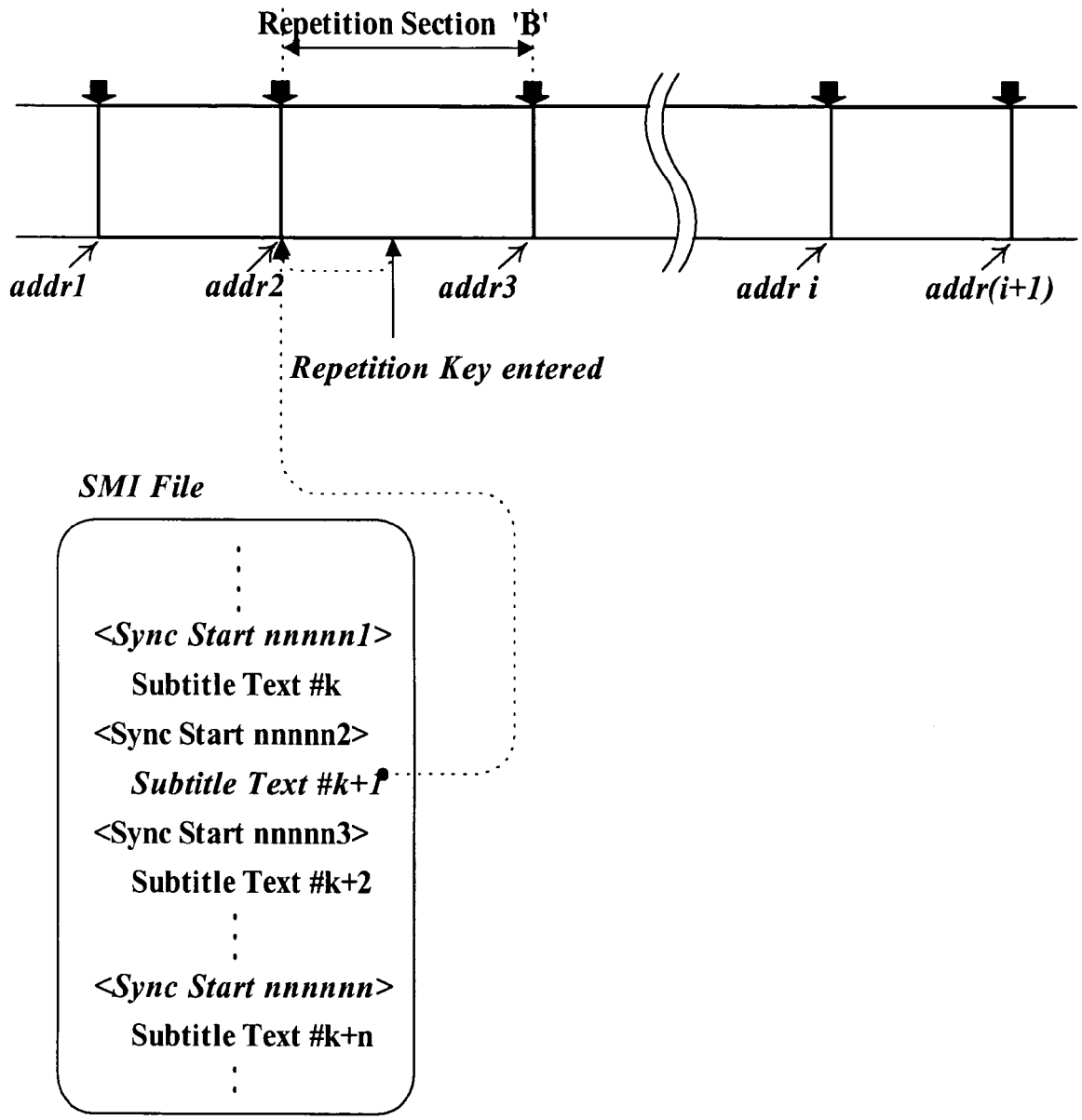
FIG. 6 illustrates how a repetitive playback video section is determined on the basis of caption texts according to the flowchart of FIG. 5.

If the DivX A/V data frame is found, the subtitle text whose sync start time matches the A-B repetitive playback start time (caption text #(k+1) shown in FIG. 6) is decoded to be displayed on screen and at the same time, the decoding and reproduction operation of the DivX A/V data restarts from the DivX A/V data frame found so that the A/V data and the corresponding subtitle of the repetitive section are displayed simultaneously. At this time, the elapsed time counted by the microcomputer 14 is reset to the A-B repetitive playback start time. After that, the DivX A/V data being loaded in the memory 15 from the optical disc 10 is decoded and played back continuously just before the sync start time of the next subtitle text (subtitle text #(k+2) in FIG. 6).

When the elapsed playback time matches the sync start time of the next subtitle text (S24), playback of the DivX A/V data frame corresponding to the A-B repetitive playback start time is performed repeatedly (S22). Instead, the A-B repetitive playback operation may be performed just before the elapsed playback time matches a removal time of the subtitle text whose sync start time is equal to the A-B repetitive playback start time. The removal time of a subtitle text is determined as the sync start time of the next blank subtitle text, which is expressed by "<Sync Start=nnnnnn> " in the SMI file format.

The repetitive playback video section is played back repeatedly until a repetitive playback turn-off command (S25) or a stop command (S26) is entered. Once the repetitive playback turn-off command is entered, the optical disc reproducing apparatus returns to a normal playback mode (S20, S20-1).

FIG. 6 illustrates an example of the A-B repetitive playback operation of a repetitive playback video section (the 'B' section) including a single particular subtitle text (subtitle text #k). The example of FIG. 6 illustrates the repetitive playback method of FIG. 5. As shown in FIG. 6, the DivX A/V data frame containing the subtitle text and having the display start time that is equal to or closest to (without exceeding) when the repetition key was entered is set as the repetition section and is repeatedly displayed with the corresponding subtitle. In this embodiment, if the maximum number of the repetitive playback is predetermined or pre-set; then the selected repetitive playback section is played back repeatedly for that maximum number of times, and then the repetitive playback function may be turned off automatically without the repetitive playback stop command.

The present invention, disclosed with respect to certain embodiments, enables to provide an effective way of repetitive playback of specific video sections on the basis of sync start time of subtitles, thus offering a useful way of, e.g., practicing the speaking of foreign languages by viewing and listing to the repetitive play of the repetitive section. Furthermore, since the SMI file is editable and offered separately from DivX movie contents, the present invention also enables users to adjust sync start times of subtitles included in any video sections desired by editing the SMI file.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

What is claimed is:

1. A method of performing a repetitive playback of a video section of video data, the video data stored on a recording medium in a DivX format and having video data blocks and subtitle data blocks associated with the video data blocks, the method comprising:
    receiving a request for a repetitive playback of a section of the video data, the section including at least one video data block, the request including a user selected section start time and a user selected section end time;
    retrieving at least one subtitle data block associated with the video section, in response to the request;
    shifting one of the user selected section start time and the user selected section end time to a corresponding one of a system selected section start time and a system selected section end time, the system selected section start time corresponding to a start time of a first of the at least one subtitle data block, and the system selected section end time corresponding to an end time of a last of the at least one subtitle data block; and
    repeatedly playing back the video section in synchronization with the at least one subtitle data block.

2. The method of claim 1, wherein the subtitle data blocks are stored in a file separate from the video data blocks.

3. The method of claim 2, wherein the file is a SMI file.

4. The method of claim 1, further comprising:
storing subtitle display time information together with the subtitle data blocks, the subtitle display time information indicating a display start time of each of the subtitle data blocks.

5. The method of claim 1, wherein the repeatedly playing back step automatically repeats the playing back for a predetermined number of times.

6. An apparatus for performing a repetitive playback of a video section of video data, the video data stored on a recording medium in a DivX format and having video data blocks and subtitle data blocks associated with the video data blocks, the apparatus comprising:
a recording/reproducing part configured to record and/or reproduce the video data to/from the recording medium; and
a controller configured to
receive a request for a repetitive playback of a section of the video data, the section including at least one video data block, the request including a user selected section start time and a user selected section end time;
retrieve at least one subtitle data block associated with the video section, in response to the request;
shift one of the user selected section start time and the user selected section end time to a corresponding one of a system selected section start time and a system selected section end time, the system selected section start time corresponding to a start time of a first of the at least one subtitle data block, and the system selected section end time corresponding to an end time of a last of the at least one subtitle data block; and
repeatedly play back the video section in synchronization with the at least one subtitle data block.

7. The apparatus of claim 6, further comprising:
a memory configured to store the subtitle data blocks in a file separate from the video data blocks.

8. The apparatus of claim 7, wherein the file is a SMI file.

9. The apparatus of claim 6, further comprising:
a storage device configured to store subtitle display time information together with the subtitle data blocks, the subtitle display time information indicating a display start time of each of the subtitle data blocks.

10. The apparatus of claim 6, wherein the playing back of the at least one video data block in synchronization with the at least one subtitle data block is automatically repeated for a predetermined number of times.

* * * * *